Patented July 28, 1925.

1,547,539

UNITED STATES PATENT OFFICE.

ANDREAS VON ANTROPOFF, OF KARLSRUHE, GERMANY, ASSIGNOR TO THE FIRM: KOHOLYT AKTIENGESELLSCHAFT, OF BERLIN, GERMANY.

PROCESS FOR INCREASING THE LIFE OF GRAPHITE OR CARBON ELECTRODES.

No Drawing. Application filed December 8, 1923. Serial No. 679,512.

*To all whom it may concern:*

Be it known that I, ANDREAS VON ANTROPOFF, citizen of the German Empire and a resident of Parkstrasse 17, Karlsruhe, Baden, Germany, have invented certain new and useful Improvements in the Processes for Increasing the Life of Graphite or Carbon Electrodes.

In order that carbon or graphite electrodes should be less liable to attack, which is mainly due to their porosity, various proposals have been made for filling the pores with suitable substances. None of the processes directed to this object, however, so far as they provided for impregnation with liquid or dissolved materials, led to satisfactory results.

Experiments showed that an impregnation of the electrodes with paraffin, various waxes or oils not only effected no improvement, but, on the contrary, considerably shortened the life of the electrodes. A similar negative result was obtained by treating the electrodes with suitable solutions, for example of coal-tar, sugar and the like, and subsequently carbonizing the dissolved organic substances. Also, the treatment of the carbon materials with gases containing carbon which are dissociated on heating with deposition of carbon in the pores does not lead to the desired result.

The present invention provides a process, which is easily carried out, for increasing the life of the electrodes. It has been shown that when the pores are filled with soap the electrodes are very durable and their life considerably lengthened. In this case, it is immaterial whether the impregnation with the soap or a solution thereof is effected directly, or indirectly by first saturating the electrodes with saponifiable substances (fats, fatty acids) and subsequently converting these substances into soap. In this connection it has proved advantageous to conduct the impregnating operation by exposure to a vacuum and to increased pressure alternately, with or without simultaneous heating, whereby the impregnating agent penetrates deeply, even into the core of the electrode. In many cases, however, it is only necessary to raise the electrode covered with the liquid impregnating agent to a sufficiently high temperature, whereby the air contained in the pores is expelled and the penetration of the impregnating agent is facilitated; an electrode impregnated with fats or fatty acids is, in order to increase its life preferably inserted as an electrode in an electrolyte through which a current of electricity is passed; in an alkaline electrolyte the direction of the current is immaterial, in other cases the electrode is preferably made the cathode.

The soaps obtained from rape-seed, oil-linseed-oil and cocoa-nut oil have proved to be especially suitable. The electrodes may be impregnated with these fats or acids thereof and subjected to a subsequent electrolytic treatment.

Example 1.

An electrode of about 7 mm. diameter and 150 mm. long was subjected to a good vacuum at a temperature of about 100° C. and impregnated in vacuo by immersion in warm soap solution. The pressure on the solution was increased to about 100 atmospheres for about a minute in order completely to fill the pores. An electrode thus treated is ready for use, and when used as an anode has a life 4–5 times as long as an untreated electrode.

Example 2.

A graphite rod electrode was immersed in raw linseed oil of 0,909 specific gravity and the air contained in the pores was displaced by heating for three-quarters of an hour at 120° C. The rod thus impregnated was then subjected to a preliminary treatment as an anode in a caustic soda solution of 20 per cent strength at 60° C. and 2 amperes for several hours. The result was an increase of the life of the electrode by, as in the previous case, four to five times as compared with the nonimpregnated electrode.

I claim:

1. In the manufacture of carbon electrodes the step which consists in impregnating the electrodes with soap.

2. In the manufacture of carbon electrodes the step which consists in subjecting the electrodes to a good vacuum at an elevated temperature, impregnating them in vacuo by immersion in warm soap solution and squeezing in the solution by increasing the pressure to about 100 atmospheres.

3. In the manufacture of carbon electrodes the step which consists in impregnating the electrodes with saponifiable substances and saponifying these substances in the electrodes.

4. In the manufacture of carbon electrodes the step which consits in impregnating the electrodes with saponifiable substances and saponifying these substances in electrodes by electrolysis using the electrodes as electrodes in an alkaline electrolyte.

5. In the manufacture of carbon electrodes the step which consists in immersing the electrodes in linseed-oil, heating them in the oil to temperatures about 100° C. and subjecting to electrolysis the electrodes as anodes in a caustic soda solution.

6. In the manufacture of carbon electrodes the step which consists in impregnating the electrodes with saponifiable substances and saponifying these substances in electrodes by electrolysis, using the electrodes as cathodes in an electrolyte containing an alkali salt.

7. In the manufacture of carbon electrodes the step which consists in immersing the electrodes in melted oleic acid, heating them in the acid to temperatures about 100° C. and subjecting to electrolysis the electrodes as cathodes in a kitchen salt solution.

8. As a new and useful composition of matter carbon electrodes impregnated with soap.

In testimony whereof I affix my signature at Riga, Latvia, this 18th day of September, 1923.

ANDREAS VON ANTROPOFF.

Witnesses:
W. LOESCH,
M. BECKMAN.